Feb. 25, 1936.  T. W. CLEVELAND ET AL  2,032,004
PRINTER'S GAUGE PIN
Filed April 2, 1935  2 Sheets-Sheet 1
Fig. 1.
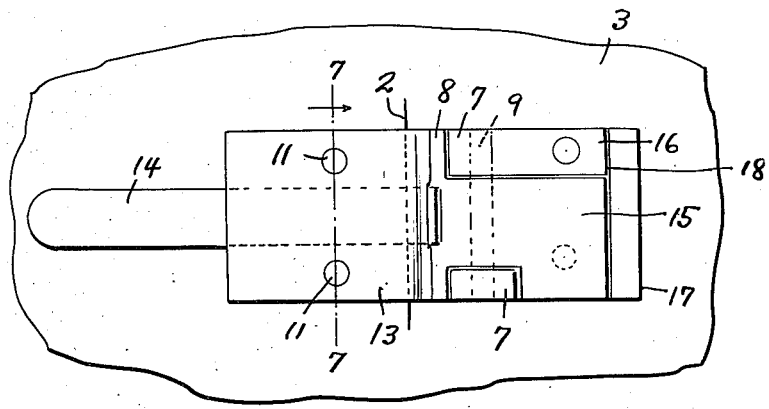
Fig. 2.
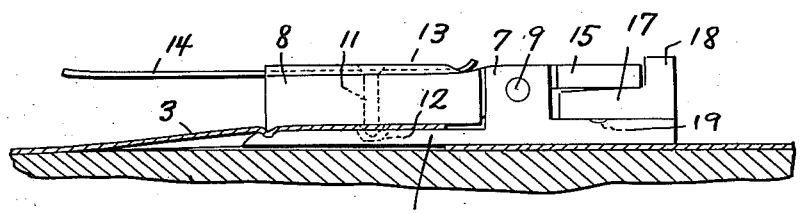
Fig. 3.
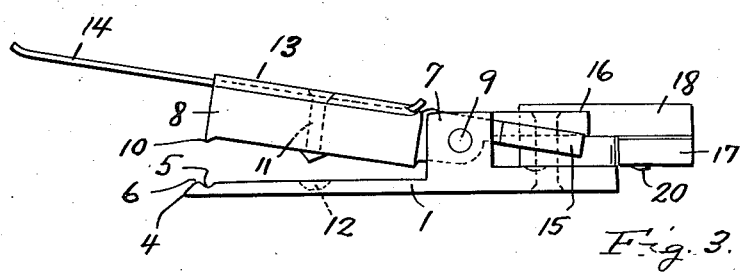
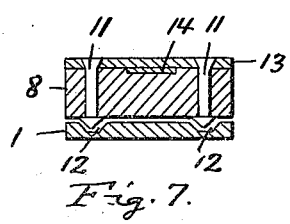
Fig. 7.
Inventors
T. W. Cleveland
Theodore W. Bunten
By Clarence A. O'Brien
Attorney Patented Feb. 25, 1936

2,032,004

UNITED STATES PATENT OFFICE 2,032,004

PRINTER'S GAUGE PIN

Theodore W. Cleveland and Theodore W. Bunten, Weston, W. Va.

Application April 2, 1935, Serial No. 14,368

1 Claim. (Cl. 101—415)

The present invention relates to new and useful improvements in printers' gauge pins and has for one of its important objects to provide, in a manner as hereinafter set forth, a device of this character comprising a novel construction, combination and arrangement of parts which will positively prevent slipping when it has been properly set in the desired position.

Another important object of the invention is to provide a printer's gauge pin which may be expeditiously locked in position and unlocked without the necessity of using extraneous means such as tool, screws, etc.

Still another important object of the invention is to provide a gauge pin of the aforementioned character embodying a construction which is such that sheets of paper fed thereto will not catch thereon, or thereunder thus eliminating a common source of annoyance.

A still further important object of the invention is to provide a gauge pin of the character described which includes a knife edge through the medium of which the usual slot may be conveniently cut in the tympan.

Other objects of the invention are to provide a printer's gauge pin which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in top plan, showing a printer's gauge pin constructed in accordance with the present invention clamped on a tympan.

Figure 2 is a view in side elevation thereof.

Figure 3 is a side elevational view of the invention, showing the jaw open.

Figure 7 is a view in vertical transverse section through the invention, taken substantially on the line 7—7 of Figure 1.

Figure 4:
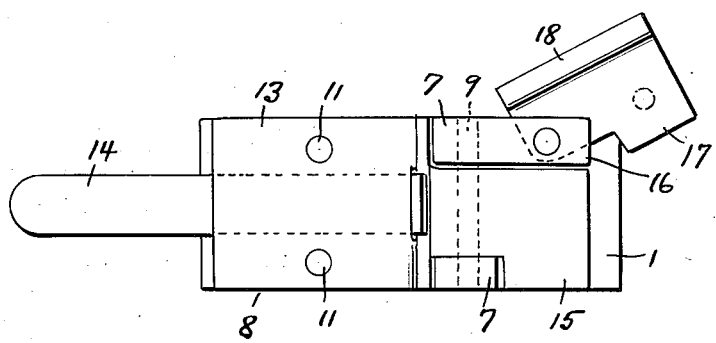
Figure 4 is a top plan view of the invention, showing the locking wedge in retracted or inoperative position.
Figure 5:
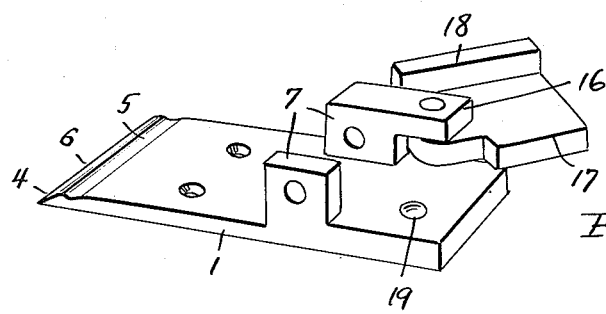
Figure 5 is a perspective view of the lower portion of the device.
Figure 6:
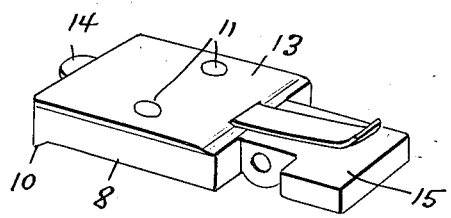
Figure 6 is a detail view in perspective of the upper or swinging jaw.

Referring now to the drawings in detail, it will be seen that the embodiment of the invention which has been illustrated comprises a base plate 1 of suitable metal which is adapted to be inserted through the slot 2 (see Figures 1 and 2) which has been previously cut in the tympan 3. At its inner end, the base 1 terminates in a knife edge 4 through the medium of which the slots 2 may be conveniently cut in the tympan 3. Adjacent the knife edge 4, the base 1 has formed transversely therein a groove or channel 5 the purpose of which will be presently set forth, the portion 6 between said groove 5 and the bevel which terminates in the knife edge 4 being substantially rounded.

Formed integrally with an intermediate portion of the base 1 and rising therefrom is a pair of spaced, opposed, apertured ears 7 between which a jaw 8 is journaled on a pin 9. Depending from the inner end of the jaw 8 is a rib 10 which is engageable in the groove or channel 5 for firmly securing the device on the tympan 3, as illustrated to advantage in Figure 2 of the drawings. Pins 11 are also provided on the pivoted jaw 8 for penetrating the tympan, or substantially penetrating said tympan, said pins being engageable in seats 12 which are provided therefor in the opposed face of the base 1.

The pins 11 also constitute means for securing a cap plate 13 in position on the pivoted jaw 8. Slidably mounted beneath the cap plate 13 is a conventional resilient tongue 14 which, as usual, functions as a guide for the paper.

Projecting outwardly from the pivoted end of the jaw 8 is an operating handle 15 which is opposed to the rear portion of the base 1. A horizontal ear 16 projects outwardly from one of the ears 7 and journaled between said ear 16 and the rear portion of the base 1 for swinging movement in a horizontal plane is a locking wedge 17 having formed thereon an upstanding flange 18 constituting a handle which facilitates operating said locking wedge. The wedge 17 is engageable between the handle 15 and the rear portion of the base 1 for forcing the jaw 8 to closed position on the tympan 3 and for positively locking said jaw 8 in said closed position. The rear portion of the base 1 has formed therein a depression or socket 19 for the reception of a detent 20 on the locking wedge 17 for securing said locking wedge in operative position.

It is thought that the manner of using the device will be readily apparent from a consideration of the foregoing. The locking wedge 17 is swung to inoperative position to permit the jaw 8 to be swung to open position by downward pressure on the handle or tail 15, as shown in Figure 3 of the drawings. The inner portion of the base 1 is then inserted through the previously cut slot 2 of the tympan 3 and the pivoted jaw 8 is then closed thereon, the locking wedge 17 being swung in a horizontal plane to operative position beneath the handle 15 in a manner to tightly close the pivoted jaw 8 and positively secure the same in closed position. This is shown to advantage in Figure 2 of the drawings. It will thus be seen that the device is positively secured against slipping on the tympan.

It is believed that the many advantages of a gauge pin constructed in accordance with the present invention will be readily apparent, particularly to those skilled in the art to which the invention pertains, and although a preferred embodiment of the device is as illustrated and described, it is to be understood that changes in the details of construction and in the combination and arrangement of parts may be resorted to which will fall within the scope of the invention as claimed.

What is claimed is:—

A gauge pin of the class described comprising a base, spaced ears rising from said base, a jaw journaled between the ears and cooperable with the base for releasably securing the pin on a tympan, an ear projecting horizontally from one of the first-named ears, a handle extending from the pivoted end of the jaw in opposed relation to the base, and a locking wedge journaled between the second-named ear and the base and engageable between said base and the handle for securing the jaw in closed position, said locking wedge including an upstanding flange constituting an operating handle.

THEODORE W. CLEVELAND.
THEODORE W. BUNTEN.